United States Patent [19]

Clay et al.

[11] 4,105,915

[45] Aug. 8, 1978

[54] DEFLECTION-TYPE MODULATOR OF LASER BEAM FOR COMMUNICATIONS

[75] Inventors: Burton Ross Clay, Wayland; Douglas Alan Gore, Billerica, both of Mass.

[73] Assignee: RCA Corporation, New York, N.Y.

[21] Appl. No.: 715,859

[22] Filed: Aug. 19, 1976

[51] Int. Cl.² .............................................. H04R 1/44
[52] U.S. Cl. .................................. 250/199; 350/285
[58] Field of Search ............... 250/199; 358/199, 201, 358/206, 208, 285, 293; 350/285, 6; 340/2, 8 R, 13 R, 14

[56] References Cited

U.S. PATENT DOCUMENTS

| | | | |
|---|---|---|---|
| 3,611,277 | 10/1971 | Yoder | 250/199 |
| 3,903,496 | 9/1975 | Stimler | 250/199 |

Primary Examiner—Robert L. Griffin
Assistant Examiner—Edward L. Coles
Attorney, Agent, or Firm—H. Christoffersen; Samuel Cohen; Carl V. Olson

[57] ABSTRACT

A deflection-type modulator, for insertion in the path of a laser beam directed to a remote receiver, includes a mirror mounted on a voice coil device and positioned in the focal plane of a lens. A prism reflects the laser beam at right angles through one-half of the lens to a focal point on the mirror. The beam is reflected back through the other half of the lens, and is reflected by another face of the prism normally to a point between two spaced photosensors at the remote receiver. An electrical audio signal applied to the voice coil device causes the laser beam to be deflected back and forth between the two photosensors at the remote receiver.

1 Claim, 5 Drawing Figures

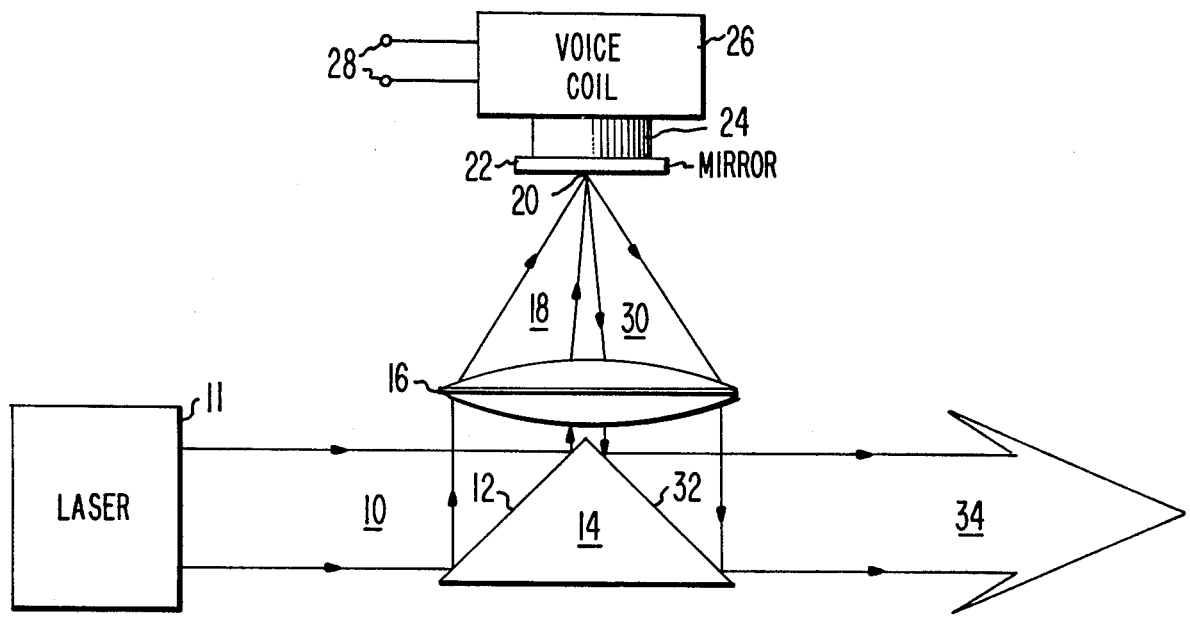
Fig.1
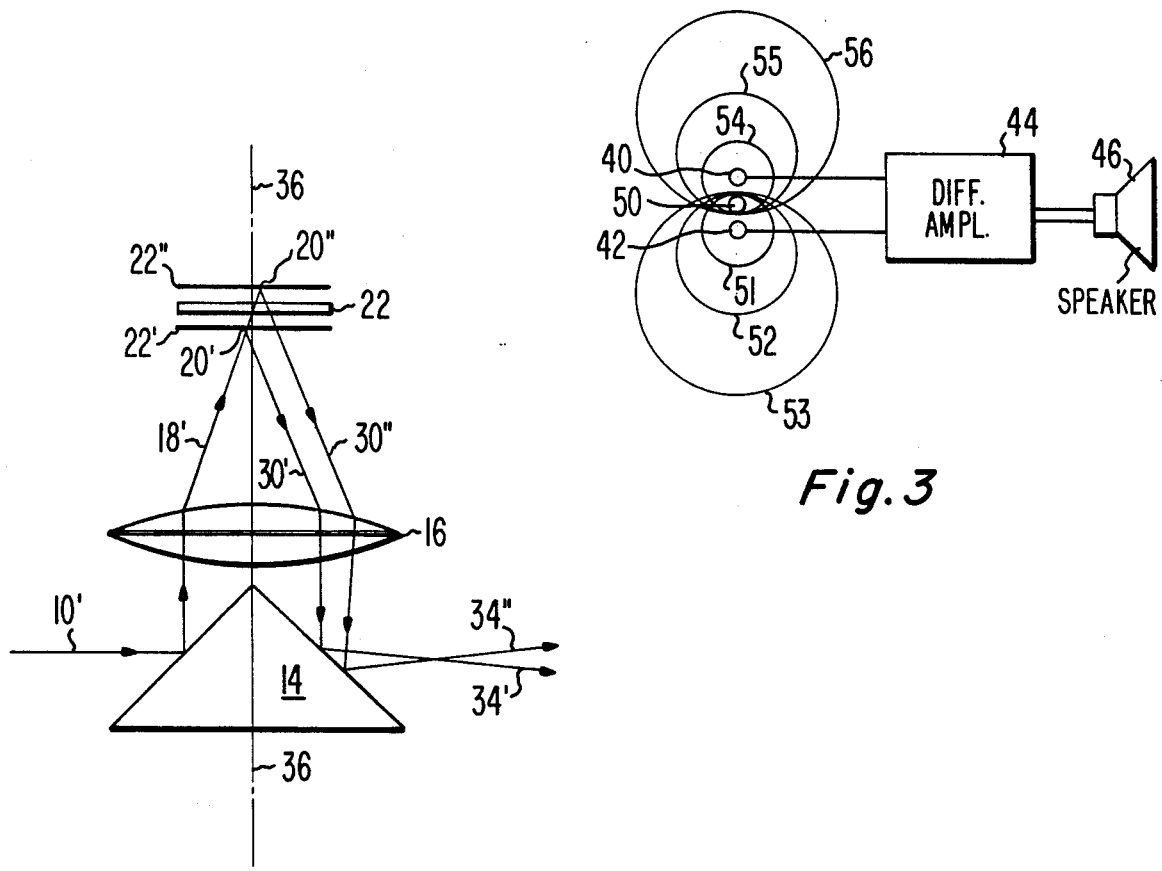
Fig.2
Fig.3

DEFLECTION-TYPE MODULATOR OF LASER BEAM FOR COMMUNICATIONS

BACKGROUND OF THE INVENTION

Systems for communicating intelligences, such as speech, from a local point to a remote point over a laser light beam include a means for modulating the light beam. Known light modulators for use with lasers include modulators employing the Kerr effect, the Pockels effect, the acoustically-excited Bragg effect, the magnetic Kerr effect, the Cotton-Moulton effect and the electrochromic effect. The prior art modulators each suffer from some disadvantage, such as expense or unreliability. The light modulator to be described herein has the advantages of being able to handle a relatively large throughput, being easily fabricated at low cost, being small, lightweight, rugged, reliable, efficient and requiring very little modulation power.

SUMMARY OF THE INVENTION

The deflection of a laser beam is modulated by moving a mirror normally positioned in the focal plane of a lens. The laser beam is directed through half of the lens to the mirror, from which it is reflected out through the other half of the lens. The deflection of the beam is detected at a remote location by two spaced, stationary photosensors.

BRIEF DESCRIPTION OF THE DRAWING

FIG. 1 is a diagram of a deflection-type light-beam modulator constructed according to the teachings of the invention;

FIG. 2 is a diagram illustrating how displacement of a mirror in the modulator of FIG. 1 causes a corresponding deflection of the light beam;

FIG. 3 is a diagram of a modulated light beam receiver including photosensors, and representations of patterns illuminated by the beam at various degrees of deflection;

DESCRIPTION OF THE PREFERRED EMBODIMENT

Figure 4A:
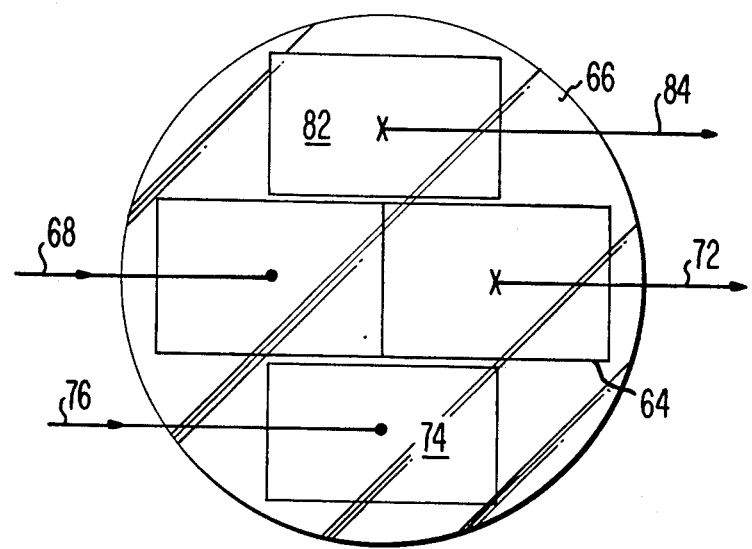
FIG. 4A is a plan view of a portion of a light beam modulator providing deflection of the beam simultaneously in two orthogonal directions.

Referring now in greater detail to FIG. 1, there is shown a laser light beam 10 having a cross sectional dimension of about 1mm (0.04 inches) for a laser 11, which may, for example, be a 2 miliwatt helium-neon RCA Type LD2175 laser. The beam 10 is directed to a first reflecting face 12 of a right-angle prism 14. The beam 10 is reflected at right angles to its original path through one-half of the aperture of a spherical lens 16. The light passing through the lens converges in a path 18 to a focal point 20 on a mirror 22. The mirror 22 normally is located in the focal plane of lens 16. That is, the mirror 22 is spaced from the lens 16 a distance equal to the focal length distance of the lens.

The mirror 22 is mounted for reciprocation toward and away from the lens 16 on the "voice coil" 24 of a voice coil device 26. The voice coil device 26 includes a permanent magnet (not shown), and terminals 28 for the application of an electrical modulating signal, such as the electrical signal supplied by a microphone. The voice coil device 26 is an inexpensive, mass-produced unit used in audio loud speakers.

Alternatively, the mirror 22 may be attached to the sound-wave-responsive part of a microphone so that spoken speech directly moves the mirror 22. In either case, the mirror 22 may be constructed of vacuum-deposited aluminum on mylar which is 0.0005 inches thick. A multilayer transparent dielectric coating may be added to enhance the reflectivity to laser light of wavelength equal to 6328 Angstroms and to withstand laser beams of high power.

Light reaching mirror 22 along path 18 is reflected from the mirror along path 30 to the other half of lens 16. The light passing through the other half of lens 16 is reflected by a second reflecting surface 32 of the prism 14 toward a remote point along a path 34 having exactly the same direction as the path 10 from the laser (not shown). Light leaving the modulator of FIG. 1 may be passed through a 6 power telescope to increase the beam diameter from 1 mm to 10 mm to reduce the danger of eye damage.

Reference is now made to FIG. 2 for a description of how the light beam exiting from the modulator is deflected by movement of the mirror 22 toward and away from the lens 16. If the reflecting surface of mirror 22 is moved by the voice coil device 26 toward the lens 16 to the plane 22', a ray 10' of the entrance beam follows a path 18' to a point 20' on the mirror, from which the ray follows path 30' and downwardly-deflected path 34' toward the remote terminal. The deflection to the path 34' results from the fact that the ray 18' strikes the mirror 22 at a point 20' which is to the left of the focal point on the centerline 36 of the optical system reached when mirror 22 is in its normal position.

If the reflecting surface of mirror 22 is moved to the plane 22", the ray 10' follows a path 18' to a point 20" on the mirror, from which the ray follows path 30" and upwardly-deflected path 34" toward the remote terminal.

FIG. 3 shows a receiving terminal including two stationary spaced photosensors 40 and 42, connected to the input of a differential amplifier 44, which is in turn connected to a loud speaker 46. The photosensors 40 and 42 each may constitute a silicon diode located at the focus of a 150 mm (6 inch) diameter spherical mirror. 100 Angstrom bandpass filters are placed over the diodes. The photosensors are spaced apart a distance about equal to the diameter 50 of the undeflected laser beam at the remote terminal. When the laser beam is given increasing amounts of downward deflection by mirror 22 at the transmitting terminal, the cross sectional area of the laser beam at the receiving terminal occupies areas of the represented at 51, 52, and 53. Likewise, when the laser beam is given increasing amounts of upward deflection, the cross sectional area of the laser beam occupies areas represented at 54, 55 and 56.

It is noted that the modulator of FIG. 1 is characterized in causing a progressive enlargement of the cross sectional area of the beam at the receiver with increasing deflection of the beam. In an actually-operated system, the beam at a receiver located 3 kilometers (1.9 miles) from the transmitter had a maximum cross-sectional diameter 53 or 56 equal to about 7.6 meters (25 feet). The intensity modulation of the light at the receiver was proportional to the square of the modulation at the receiver. If the spherical lens 16 is replaced by a cylindrical lens, the intensity modulation of the beam varies linearly with displacement of reflector 22. The two photosensors 40, 42 are connected to two respective inputs of a differential amplifier 44 so that the amplifier responds in a push-pull fashion which gives a signal-to-noise ratio advantage when operating over long distances through turbulent air. Air turbulence displacements in the plane of the paper on which FIGS. 1 and 2 are drawn do not cause changes in the difference signals produced by amplifier 44.

Figure 4B:
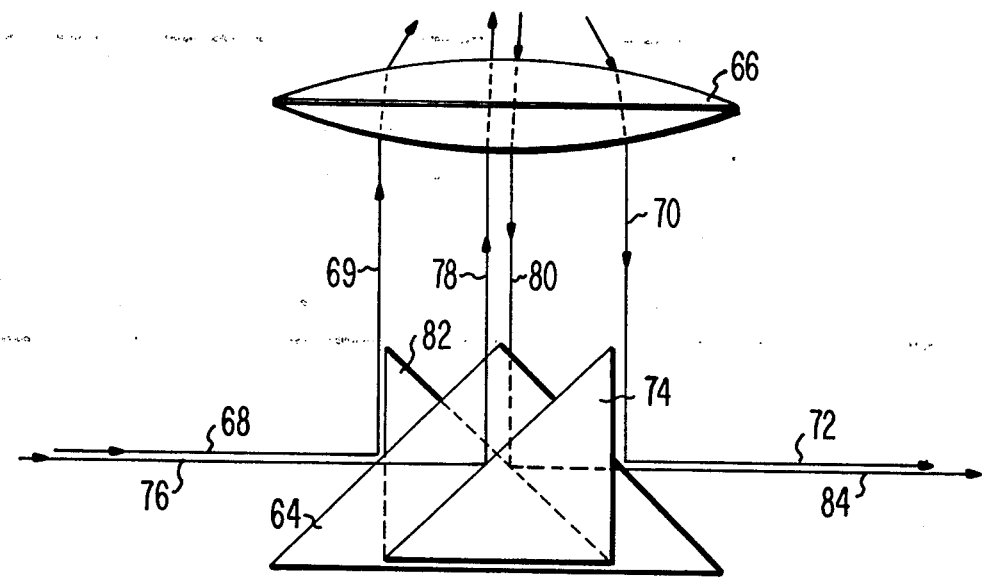
FIG. 4B is an elevation of the elements shown in FIG. 4A.

An arrangement for reducing the effects of air turbulence in both the horizontal and the vertical directions is illustrated in FIGS. 4A and 4B. The arrangement includes a prism 64 like the prism 16 in FIG. 1, a lens 66 like the lens 16, and a voice coil operated mirror (not shown) like the mirror 22. A ray 68 of the beam follows the paths 69, 70, and 72 toward the receiving terminal in the same manner as has been described in connection with FIGS. 1 and 2.

In FIGS. 4A and 4B, an additional reflector 74 reflects a ray 76 of the entrance beam along a path 78 through lens 66 to a mirror (not shown) and then back through the lens along a path 80 to a second reflector 82 and out along path 84 parallel to path 72.

In the operation of a modulator having the prism reflectors shown in FIGS. 4A and 4B, the prism reflector 64 acts the same as prism reflector 14 in FIGS. 1 and 2. When the mirror 22 is reciprocated by the voice coil 26, the light beam at the receiving terminal oscillates back and forth along a vertical line in FIG. 3 through the positions 51 through 56 to provide immunity to atmospheric disturbances in direction of deflection. At the same time, a portion 76 of the entrance beam is reflected by reflector 74, passes through lens 66, is reflected by the voice-coil operated mirror, returns through lens 66 and is reflected by reflector 82 along path 84 to the receiving terminal. In this case, the receiving terminal contains an additional pair of photosensors (not shown) arranged along a line to the line of photosensors 40 and 42 in FIG. 3.

The portion of the beam reflected by reflectors 74 and 82 in FIGS. 4A and 4B is deflected by the modulator back and forth along a line normal to the line of photosensors 40 and 42 in FIG. 3 in such a way as to provide immunity to atmospheric disturbances in the direction of deflection. The additional photosensors (not shown) are connected to an additional differential amplifier (not shown), and the outputs of the two differential amplifiers are combined before application to a speaker or other utilization device. The combined electrical signal is relatively free of the effects of atmospheric disturbances in both horizontal and vertical directions. The arrangement is one in which part of the entrance beam passes through opposite quadrants or halves of the lens 66, and the other part of the entrance beam passes through the remaining opposite quadrants or rotated halves of the lens 66. The entrance beam is simultaneously deflected in two orthogonal directions.

While the invention has been described as useful for the transmission of audio-frequency intelligence, higher video frequency signals can be transmitted by employing a "voice coil device" 26 for mirror 22 which is capable of operation at higher frequencies. The device may, for example, be a piezoelectric driver, or may be a type of voice coil device including a "distributed coil" of many small conductive spirals in a plane parallel with the mirror 22, in place of a single rim coil.

What is claimed is:

1. Means to transmit intelligence from a local point to a remote point, comprising
   a lens,
   a right-angle prism disposed in proximity with said lens,
   a mirror normally spaced the focal length distance from said lens,
   a laser directing a light beam to said prism for reflection at a right-angle through half of said lens to said mirror, and back through the other half of the lens to the prism for reflection at a right-angle to the remote point,
   an electromechanical transducer connected with said mirror to reciprocate it toward and away from said lens to deflect the beam in accordance with intelligence, and
   two photosensors at the remote point positioned in spaced relation so that the light beam from the laser at the local point normally passes between photosensors, and is deflected back and forth between said photosensors when the mirror is reciprocated.

* * * * *